United States Patent [19]

Onarheim

[11] 3,989,918
[45] Nov. 2, 1976

[54] APPARATUS FOR USE IN REPAIR OF INGOT MOLDS

[75] Inventor: Einar Onarheim, Vagsbygd, Norway

[73] Assignee: Elkem-Spigerverket A/S, Oslo, Norway

[22] Filed: June 23, 1975

[21] Appl. No.: 589,469

[30] Foreign Application Priority Data
June 27, 1974 Norway................................ 2348/74

[52] U.S. Cl..................................... 219/76; 174/6; 219/73
[51] Int. Cl.².......................................... H01R 3/06
[58] Field of Search................ 174/6; 219/73 R, 76, 219/156; 338/100; 339/118 R

[56] References Cited
UNITED STATES PATENTS

| | | | |
|---|---|---|---|
| 3,293,400 | 12/1966 | Brogdon............................ | 219/73 R |
| 3,581,039 | 5/1971 | Kanzaki et al..................... | 219/73 R |
| 3,725,669 | 4/1973 | Tatum................................. | 174/6 X |
| 3,920,948 | 11/1975 | Schokkenbroek................... | 219/76 |

Primary Examiner—J. V. Truhe
Assistant Examiner—N. D. Herkamp
Attorney, Agent, or Firm—Eyre, Mann, Lucas & Just

[57] ABSTRACT

An apparatus for the repair of ingot molds is disclosed. The ingot mold rests upon a layer of graphite powder whereby current can be passed through the ingot mold without the need for grinding thereof.

6 Claims, 1 Drawing Figure

U.S. Patent    Nov. 2, 1976    3,989,918
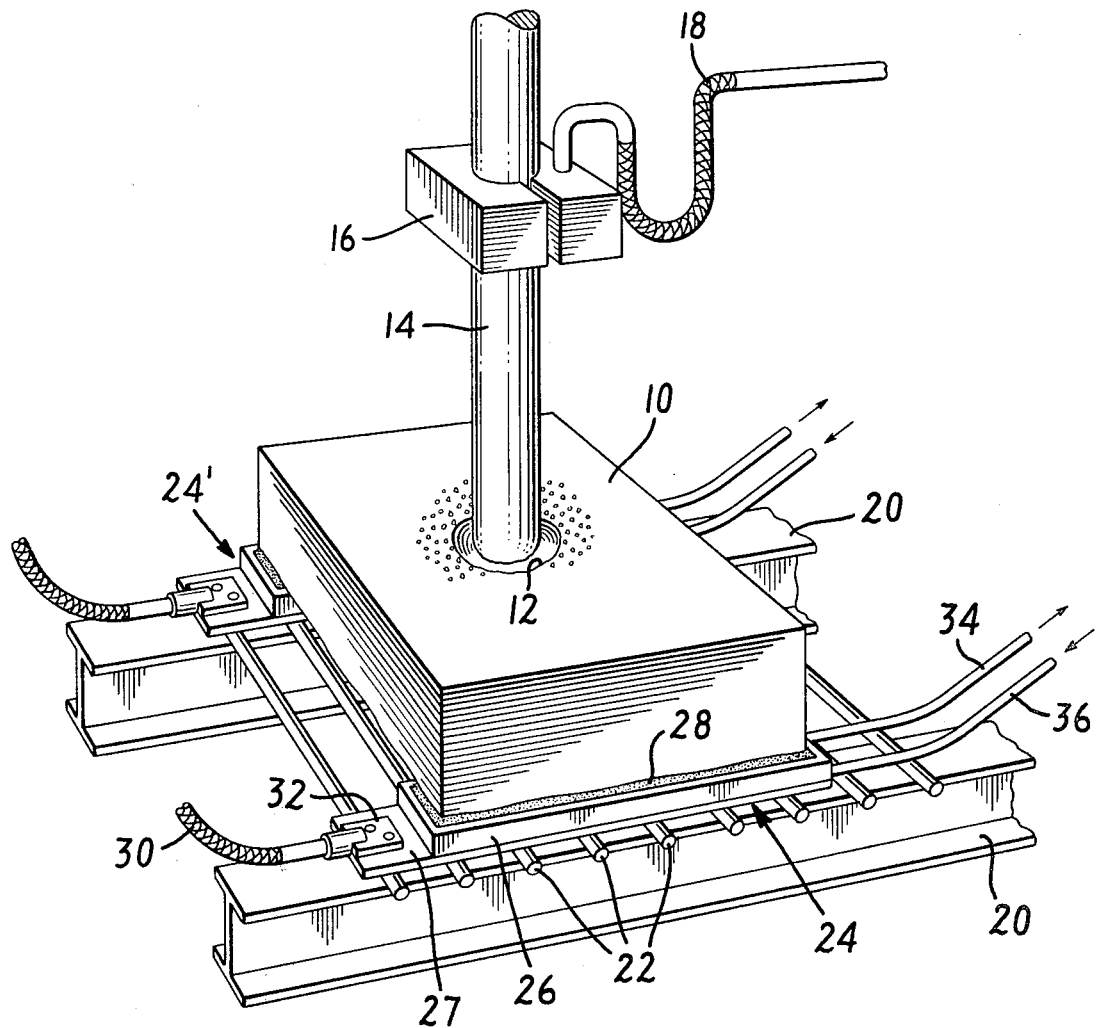

APPARATUS FOR USE IN REPAIR OF INGOT MOLDS

The present invention relates to an apparatus useful in the repair of ingot molds.

As is well known in the art, ingot molds of cast iron which are used in the steel industry for forming steel ingot will after a period of time require repair because of cavities formed therein. The usual way to effect this repair is to cause the mold in the area of the cavity to become molten by means of heat supplied through an electrode. It is an essential feature of this process that the mold be properly grounded.

One of the problems encountered is that ingot molds have a rough surface and it is therefore difficult to obtain good contact with a contact shoe. As a result of this, it has been found to be necessary to grind the ingot mold surface until the surface is smooth and then drill and thread holes so that the contact shoe can be bolted to the ingot mold surface. It will be appreciated that such a step is expensive both in terms of man-hours and grinding equipment. Additionally, since the contact shoe will only be attached to a small part of the ingot mold (or two small parts of the ingot mold if two contact shoes are bolted thereto) the paths of current through the ingot mold are far from ideal.

In accordance with the present invention an apparatus is made which is capable of transferring current from an unevenly shaped ingot mold without the need for grinding or drilling and tapping of the ingot mold. Furthermore, the device is capable of effecting highly desirable current paths in the ingot mold. The device of the present invention comprises at least one graphite bed on which the ingot mold sits.

These and other advantages of the present invention may be more fully understood with reference to the FIGURE.

In the FIGURE there is shown an ingot mold 10 with a cavity 12 for repair therein. Electrode 14 in electrode holder 16 is disposed above the mold cavity 12. Cable 18 provides electric current to the electrode 14.

The ingot mold is suitably brought to position along tracks 20 by means of rollers 22. In accordance with the present invention, contact members 24 are provided. These contact members comprise a rectangularly shaped shallow container 26 affixed to a plate 27 which is in turn affixed to a grounding cable 30 by means of contact shoes 32 permanently affixed to the plate 27. In the container 26 is a bed 28 of finely divided highly conductive material, preferably graphite powder. The height of the graphite bed 28 extends above the top of the wall of the container 26 to prevent "hot spots" occasioned by the mold coming in contact with the container 26.

Because the finely divided highly conductive material 28 can assume the irregular shape of the bottom of the mold 10, a good electrical contact is accomplished without need for grinding of the ingot mold. It is highly desirable to have the contact member 24 extend throughout a substantial portion of the length or width of the mold in order to achieve a distribution of current paths through the mold 10. To further aid in accomplishing this, a second contact member 24' is preferably used on the other end of the ingot mold as shown.

Because of the heat generated in a device of this nature, the contact member is preferably provided with a cooling medium, suitably water circulated by means of tubes 34, 36.

It will be understood that various changes and modifications of the apparatus described can be made while still achieving the result of the present invention. The essential feature of the present invention is that the ingot mold is placed in direct contact with a bed of electrically conductive material which in turn is electrically grounded. It will therefore be understood that the claims are intended to cover all changes and modifications of the preferred embodiment of the invention, herein chosen for the purpose of illustration, which do not constitute departures from the spirit and scope of the invention.

What is claimed is:

1. In the method of repairing ingot molds by heating the mold with electric current supplied by an electrode, the improvement comprising resting the ingot mold on a bed of finely divided electrically conductive material which is electrically connected to ground.

2. In an apparatus for the repair of ingot molds by heating the mold with an electric current supplied by an electrode, a contact member for the ingot mold, said contact member comprising a finely divided highly conductive material on which the ingot mold rests, said finely divided highly conductive material being electrically grounded.

3. The apparatus of claim 2 wherein the finely divided highly conductive material is graphite powder.

4. The apparatus of claim 2 wherein the finely divided highly conductive material is contained within a rectangularly shaped shallow container.

5. The apparatus of claim 4 wherein the container is cooled.

6. The apparatus of claim 5 wherein the cooling means comprises the circulation of water through the container.

* * * * *